June 29, 1965  R. S. PEARSON  3,192,423
COIL END CONNECTING MEANS FOR SPLIT WINDINGS
OF DYNAMOELECTRIC MACHINES
Filed Nov. 29, 1962

INVENTOR.
ROBERT S. PEARSON
BY
HIS ATTORNEY

United States Patent Office 3,192,423
Patented June 29, 1965

3,192,423
COIL END CONNECTING MEANS FOR SPLIT WINDINGS OF DYNAMOELECTRIC MACHINES
Robert S. Pearson, Erie, Pa., assignor to General Electric Company, a corporation of New York
Filed Nov. 29, 1962, Ser. No. 240,984
5 Claims. (Cl. 310—201)

This invention relates to dynamoelectric machines and more particularly to connecting means for connecting the coil ends of the rotor and stator windings thereof.

In the past the coils for use in many dynamoelectric machines such as motors and generators have been preformed to the desired shape, suitably insulated and then assembled in the slots of the armature or stator. In such machines the coil sides are displaced a suitable number of electrical degrees so that one coil side is assembled into one slot and the other coil side into a slot displaced the required distance therefrom. For example, in a two-pole machine, the respective coil sides of an armature coil are placed in complementary slots approximately 180 electrical degrees apart. Normally each slot contains a plurality of coil sides so that the ends of each coil are required to be "skewed," or provided with a suitable reverse bend so that one coil side is adapted to lie in the lower portion of its slot and the other coil side is adapted to lie in the upper portion of its slot. To overcome various disadvantages associated with the skewed end turns of the coils such as for example, increased length, "split" coils are often employed. In such a split coil construction, each coil side is preformed separately, assembled into its proper slot and the associated ends thereafter connected together, as by brazing, welding or the like, to complete the coil.

For many applications, for example aircraft and missile generators, higher outputs must be achieved without a corresponding increase in the size and weight limitations.

In high quality, high reliability machines, it is extremely important to secure a bond between the ends of the associated coil sides which has a low electrical resistance to avoid excessive losses and one which is also mechanically strong so that the ends may not become disconnected under the influence of the high centrifugal forces which may occur during certain conditions of operation. Moreover, as stated hereinbefore, size and weight are often serious considerations so that the coil ends are best kept as short as possible.

In the past the ends of the coil sides to be connected were forced together as nearly as possible and, while held in this position, brazed or welded together. This procedure has not been entirely satisfactory since in many cases the ends could still not be mechanically orientated to any close degree. In addition, forcing the ends of the coil sides toward each other in this manner resulted in producing localized pressures tending to crush or otherwise damage the insulation. Also since the electrical conductivity of the braze or weld material joining the ends was relatively so much lower than that of the conductors themselves, the connection between short conductor ends often had a prohibitively high electrical resistance. For example, such a bond may be adequate to pass certain tests but may be incapable of continuously carrying the rated current without producing local resistance heating.

It is an object of this invention, therefore, to provide improved connecting means for the ends of split windings of dynamoelectric machines.

Briefly stated, in accordance with one aspect of this invention, preformed conductor elements are suitably disposed in the slots of an armature or stator core. For an armature construction, one end of each conductor element is connected to an appropriate commutator segment. The other ends of predetermined conductor elements capable of forming a coil winding are disposed within the opposed channels in an electrically conducting connecting member. The opposed channels are adapted to receive the ends of the conductor elements so that when the connecting member is connected to the conductor ends a low resistance, mechanically strong connection is provided therebetween.

Although for simplicity and clarity of explanation, this invention will be described in detail with respect to the "end turn" connection of the split windings, it will be understood by those skilled in the art that the invention is equally applicable to the connection at the commutator in a suitable construction.

The novel features believed characteristic of this invention are set forth with particularity in the appended claims. The invention itself, however, both as to its construction and method of operation together with further objects and advantages thereof, may best be understood by reference to the following description taken in connection with the accompanying drawing in which:

Figure 1:
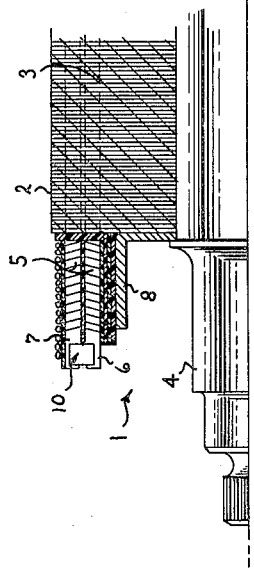
FIG. 1 is a sectional view of a portion of an armature member of a dynamoelectric machine.

Referring now to FIG. 1 there is shown an armature 1, for example for a direct current generator, having a core portion 2 with a plurality of axially extending slots 3 therein. The core 2 is mounted on a shaft 4 and suitable split windings 5 preformed from rectangular bar stock to fit the slots 3 are arranged in the slots 3 with the ends 6 and 7 projecting beyond the core 2. The end 6 of one coil side from the lower portion of one slot underlies the end 7 of the other coil side from the upper portion of a different slot displaced the required number of electrical degrees therefrom. The opposite ends of the coil sides are connected to the commutator (not shown) in any suitable manner. An end turn supporting member 8 secured to shaft 4 is provided for supporting the ends 6 and 7 of the coils sides.

In accordance with this invention a coil end connecting member 10 is provided having for example a generally H-shaped configuration so that two opposed channels 11 and 12 are provided and adapted to receive the lower and upper ends 6 and 7 respectively of the coils. The coil ends 6 and 7 rest upon the rib section 14 of connecting member 10 and the opposite parallel side portions 16 and 17 thereof which define the channels contact and bridge the coil ends 6 and 7. The connecting member 10 is thereafter brazed, welded or otherwise connected to the ends 6 and 7 to provide a low resistance mechanically strong connection therebetween. Since the connecting member 10 provides for increased area for carrying current, the ends 6 and 7 may be made short without danger of introducing a high resistance connection therebetween.

Figure 2:
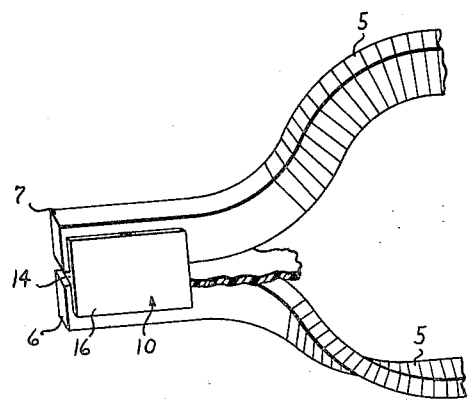
FIG. 2 is an enlarged view showing the improved coil end connection means of the present invention; and, FIGS. 3–5 are sectional views illustrating various embodiments of the connecting member of this invention.

The arrangement of the split coil sides of the winding 5, the ends 6 and 7 thereof and the connecting member 10 is shown in more detail in FIG. 2. As shown, the parallel side sections 16 and 17 of connecting member 10 contact and bridge the space between the ends 6 and 7 of the coil sides to provide increased area for carrying current as well as increased area for brazing, welding or otherwise joining the ends. At the same time the rib section 14 contacts and separates the ends 6 and 7 which are carried in the channels 11 and 12 so that no excessive pressure is applied to the electrical insulation disposed between the split windings 5. The channels of member 10 further providing for a very high degree of mechanical orientation between the ends 6 and 7.

The connecting member 10, therefore, functions to align the ends 6 and 7 of the split windings 5, maintain a suitable spacing between the conductors to prevent damage to insulation and provide an increased area for brazing or welding and for carrying current so that the bond between the ends of the split windings is both mechanically strong and of low electrical resistance. The connecting member 10 should be constructed of the same material as that of the windings so as to possess substantially the same electrical conductivity and not introduce difficulties incident to the use of dissimilar metals in a current carrying conductor. For example, when the preformed conductor elements are copper, then connecting member 10 should also be fabricated of copper.

Figure 3:
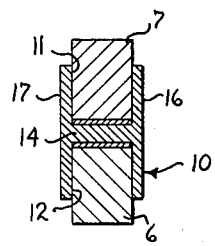
Figure 4:
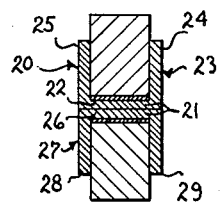

The connecting member 10 may be constructed, as shown in the embodiment of FIG. 3, from a solid body of an electrically conductive material, such as copper, having channels 11 and 12 formed therein and adapted to receive the ends 6 and 7 of the split windings 5. Alternatively, the connecting member 10 may be fabricated as shown in the embodiment of FIG. 4 from a suitably shaped sheet of electrically conductive material, such as copper, and then bent upon itself to form the similar connecting member designated generally at 20. As shown in FIG. 4, the connecting member 20 has the same generally H type configuration, however, the rib 21 separating the two channels is not a solid piece but instead comprises the portion 22 of the generally U-shaped section 23, having vertically upstanding sides 24 and 25, and the portion 26 of the similar and oppositely directed U-shaped section 27, having vertically depending sides 28 and 29. To assure a good electrical connection between these two adjacent portions 22 and 26, holes 30 and 31 may be provided as shown more particularly in FIG. 5 to allow the brazing material to flow freely between the two portions.

Figure 5:
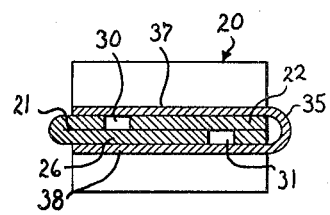

In FIG. 5 there is also shown the connecting member 20 having an insert 35 of connecting material such as for example, weld or braze material, disposed over the rib section 21 made up of adjacent portions 22 and 26. When assembled, the ends 6 and 7 of split windings 5 contact the sides 37 and 38 of the insert 35 so that a low resistance, mechanically strong braze or weld connection is accomplished by merely subjecting the connecting member 20 and the ends 6 and 7 of the windings to a sufficiently elevated temperature to cause fusion therebetween. It will be readily apparent that although, for simplicity, the insert 35 has been illustrated only for the embodiment of FIG. 5, such insert is equally applicable with the other embodiments.

While the invention has been described herein with respect to specific applications and embodiments, many changes and modifications will occur to those skilled in the art. It, therefore, is to be understood that the appended claims are intended to cover all such changes and modifications as come within the true spirit and scope of the invention.

What I claim as new and desire to secure by Letters Patent of the United States is:

1. In a dynamoelectric machine including a member having a plurality of slots therein, the combination comprising: preformed conductor elements disposed in said slots adapted to form separate coil sides of an unconnected winding, the conductor elements disposed in predetermined slots being arranged, formed and adapted to provide a coil including paired upper and lower end portions; and an electrically conducting connecting member brazed to said ends so that said conductors form a complete coil, said connecting member comprising a body having oposed open channels therein adapted to receive and orient said ends, each of said open channels having a depth which is less than the height of said conductor to be received thereby so that said conductors extend above the sides of said channels.

2. The combination of claim 1 wherein said connecting member includes an insert of electrically conductive brazing alloy material adapted to underlie the ends of said coil sides disposed in said channels.

3. The combination of claim 1 wherein said connecting member has a generally H configuration.

4. The combination of claim 3 wherein said connecting member includes a bifurcated insert of a brazing alloy material one section thereof disposed on either surface of the rib section of said H-shaped member.

5. In an armature having a core, a commutator and a plurality of conductor slots in said core, the combination with said armature of preformed conductor elements disposed in said slots and haivng one end connected to a predetermined segment of said commutator; and an electrically conducting connecting member brazed to provide an electrical connection to the other ends of predetermined conductor elements remote from said commutator adapted to form a coil, said connecting member having opposed open channels therein adapted to receive and orient said other ends, each of said open channels having a depth which is less than the height of said conductor to be received thereby so that said conductors extend above the sides of said channels.

References Cited by the Examiner

UNITED STATES PATENTS

| 2,400,902 | 5/46 | Allen | 310—201 |
| 2,791,667 | 5/57 | Clark | 310—234 |
| 2,826,707 | 3/58 | Camprubi | 310—234 |

FOREIGN PATENTS 777,588   12/34   France.

MILTON O. HIRSHFIELD, *Primary Examiner.*